INVENTOR
J.E. HAVELY

BY *Young & Quigg*

ATTORNEYS

United States Patent Office 3,488,801
Patented Jan. 13, 1970

3,488,801
MOVABLE BLOW PIN FOR DIRECTIONAL COOLING
John E. Havely, Winfield, Kans., assignor to Phillips Petroleum Company, a corporation of Delaware
Filed July 5, 1966, Ser. No. 562,849
Int. Cl. B29c 17/04, 25/00
U.S. Cl. 18—5                                   7 Claims

ABSTRACT OF THE DISCLOSURE

In an apparatus for blow molding a parison, at least one blow needle is provided with means to move said needle so that the outlet of the needle can be directed towards various parts of the parison to achieve selective cooling. In one embodiment, two concentric needles are provided, the initial blowing air being introduced through the outer needle with the inner needle being adapted to move longitudinally and/or rotatably to direct cooling fluid to particular parts of the parison.

---

Figure 1:
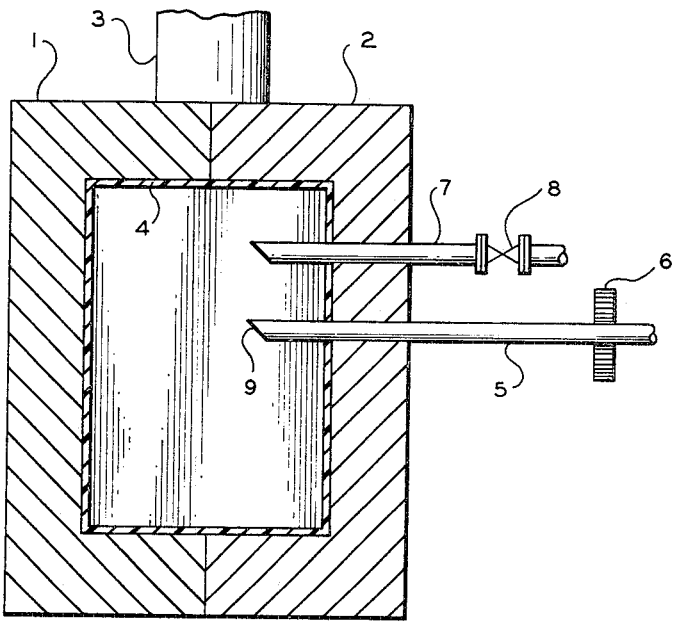

This invention relates to apparatus for blow molding.

Heretofore thermoplastics have been blow molded by pressuring the interior of a heated thermoplastic parison to push the walls of same outwardly into contact with a mold surface. However, with large and/or intricate articles it is oftentimes difficult to effect uniform cooling of all portions of the molded thermoplastic without causing some warping and/or undesirable internal surface markings on the molded article. These and other problems relating to proper cooling of blow molded articles are especially prominent in blow molded articles that have relatively small internal cavities and which are blown by means of hollow piercing needles.

It has now been found that very uniform cooling of a blow molded article can be achieved utilizing hollow needle means for piercing the thermoplastic and for carrying blowing and/or cooling fluid to the interior of the thermoplastic parison by forming the needle means so that its outlet orifice is at an angle to the longitudinal axis of the needle means thereby causing fluid issuing from that outlet to be directed towards a certain locus of the thermoplastic. Further, the needle means is rotatably carried so that it can be turned and its outlet made to face toward any desired locus or loci before and/or during the molding operation. It has further been found that cooling of the thermoplastic can be even further improved by employing one or more pressure relief means which are also adapted to pierce the thermoplastic and to vent the interior of the thermoplastic to the atmosphere when the pressure in the interior of that thermoplastic reaches a preset maximum value. By venting the interior of the thermoplastic, cooling fluid is drawn towards that portion of the thermoplastic through which the venting needle pierces same. Thus, by careful placement of a venting needle or needles, cooling fluid can be drawn to hard-to-cool portions of the thermoplastic.

According to the method of this invention a thermoplastic parison is blow molded using a needle which punctures the parison and admits a blowing fluid to the interior thereof. Then, after the parison has been molded sufficiently to require some cooling thereof, a cooling fluid is introduced into the interior of the molded parison and directed towards certain loci thereof. Thereafter, at certain hard-to-cool points of the molded parison the interior of that parison is vented thereby cooling those points. Further, according to this invention, the cooling fluid admitted to the interior of the molded parison is directed towards a plurality of points on the interior of the parison by rotating and/or longitudinally moving the needle through which the cooling fluid flows.

Accordingly, it is an object of this invention to provide a new and improved blow molding apparatus.

Other aspects, objects, and the several advantages of this invention will be apparent to those skilled in the art from the description, drawings, and appended claims.

In FIGURE 1 there is shown a cross section of blow molding apparatus embodying this invention.

Figure 2:
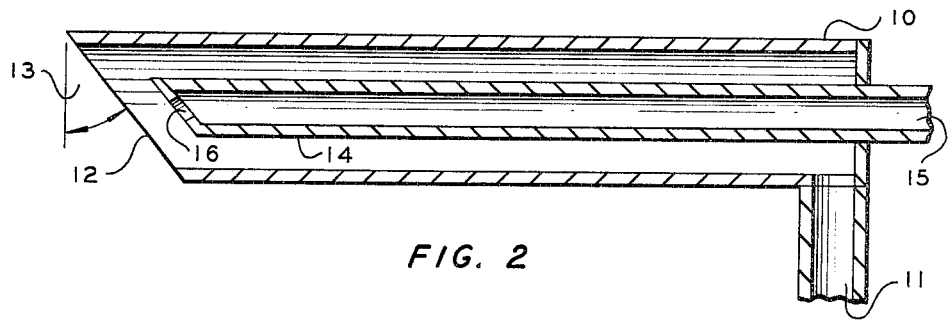

In FIGURE 2 there is shown a cross section of a hollow needle means for use according to this invention.

Figure 3:
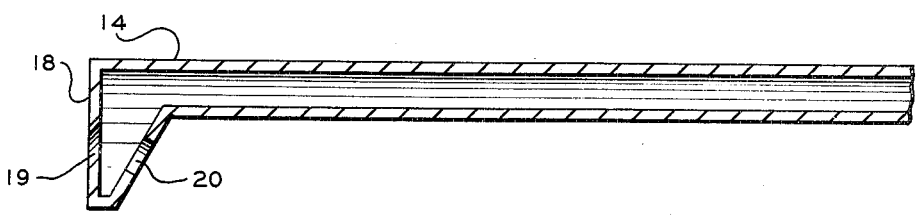

In FIGURE 3 there is shown a cross section of a specific type of cooling needle useable with this invention.

In FIGURE 1 there is shown a pair of mold halves 1 and 2 closed together below a conventional extrusion die 3. Die 3 extrudes a thermoplastic parison 4, normally in the form of a heated cylinder, of thermoplastic and molds 1 and 2 close about the parison sealing the top and bottom thereof and puncturing same with needle 5. Blowing fluid, normally air at ambient temperature, is admitted to the interior of parison 4 to extend same outwardly in all directions against the inner surfaces of 1 and 2 and to form a molded, thermoplastic article such as a bottle carrier, a cup, a toy, and the like. The parison can be partially extended by sealing the bottom thereof and admitting air through the top thereof so that needle 5 can readily puncture the wall of the parison.

Needle 5 is frictionally fit through an orifice in mold half 2 but is sufficiently loose to allow both rotation and longitudinal movement of the needle. Needle 5 can be rotated in any conventional manner including hand rotation, rotation by use of gear means 6, and the like.

The interior of the molded parison is vented to the atmosphere by needle 7 which also punctures the parison and which carries a resiliently biased, normally closed valve means 8. Valve 8 is adapted to open when the internal pressure of the molded article reaches a predetermined maximum.

After parison 4 is molded in 1 and 2 and is ready for cooling, a cooling fluid can be admitted through needle 5 instead of air at ambient temperature. The cooling fluid can be refrigerated air or any other cooled fluid including liquefied gases such as liquid carbon dioxide, the liquefied gases vaporizing in the interior of the molded thermoplastic.

When sufficient cooling fluid has been injected into the interior of the molded thermoplastic and the pressure in the interior of the thermoplastic and needle 7 reaches a predetermined maximum value, valve 8 opens and the interior of the molded thermoplastic is vented to the atmosphere thereby drawing cooling fluid to that point of the molded thermoplastic where needle 7 pierces same and causing cooling in the area of that point of piercing. Thus, by placing one or more needles 7 at points where the molded thermoplastic is difficult to cool, because of its remoteness to needle 5, these difficultly cooled points or areas are readily cooled by the venting needles.

Localized cooling of hard-to-cool areas of the molded thermoplastic can be achieved without the use of venting needles 7 by making injection needle 5 directional in that it directs the fluid emitting from its outlet end 9 towards a limited portion of the interior of molds 1 and 2. Thus, the cooling fluid emitting from the outlet end of needle 5 is directed towards certain loci of the interior of the molded thermoplastics.

The direction of the cooling fluid can be set before the molding operation takes place by simply rotating needle 5 so that outlet 9 is pointed in the direction of the locus desired to be specifically cooled and the needle fixed in that orientation during the whole molding process. Also, the needle can be rotated and/or moved longitudinally during the cooling portion of the molding process, thereby directing the cooling fluid to a plurality of areas on the interior of the molded thermoplastic.

Longitudinal movement of needle 5 during the cooling portion of the molding process allows the cooling fluid emitting from that needle to cover substantially the entire interior of the surface of the molded thermoplastic.

A plurality of single injection needles 5 can be employed or one or more pairs of concentric needles such as those shown in FIGURE 2 can be used. In FIGURE 2 there is shown an outer concentric needle 10 with a fluid inlet end 11 and an outlet end 12, the outlet end being cut at an angle 13 of about 30° to give it a piercing capability. Inner concentric needle 14 is carried by needle 10 and has inlet end 15 and outlet end 16, the outlet end 16, and therefore the outlet orifice, is at an angle to the longitudinal axis of needle 14, e.g. 30° from the vertical as angle 13, to give needle 14 a piercing capability, but, more importantly, to give outlet end 16 a directional capability, i.e. a capability for directing the flow of cooling fluid passing therethrough.

Either or both of needles 10 and 14 can be made rotatable as well as longitudinally moveable into or out from the interior of the molds. It is particularly desirable that needle 14 be moveable parallel to its longitudinal axis for a sufficient length to move outlet 16 out of and away from outlet end 12 so that needle 14 can be rotated by itself and thereby direct cooling fluid to substantially all sides, top, and bottom of the molded thermoplastic. In lieu of moving needle 14 out from the interior of needle 10, both needles 10 and 14 can be rotated together to obtain the same effect. It is desirable, when piercing thermoplastic, to keep needle 16 in the interior of needle 10 so that the piercing function is primarily carried out by needle 10.

By making the outer concentric needle 10 carry the primary piercing load, cooling fluid directional needles 14 can be given an end configuration other than that required for a piercing effect. For example, FIGURE 3 shows a blunt directional needle which can be used in the interior of needle 10, this needle having a longitudinal body portion 14 but a blunt outlet end 18 having more than one outlet orifice. One outlet orifice 19 as directed downwardly and outwardly while the other outlet orifice 20 is directed downwardly but outwardly in a direction opposite to 19 so that a plurality of areas on the interior of the molded thermoplastic are contacted by the cooling fluid whether needle 14 is rotated or moved longitudinally or remains fixed during the cooling process. End 18 of needle 14 can be angled as with outlet 12 and angle 13.

Of course, if desired, needle 10 can be used to carry the cooling fluid whereas needle 14 is used to carry the blowing fluid or any combination can be used even that combination which employs both needles 10 and 14 to inject blowing air first and thereafter using both needles to inject cooling fluid. Also, more than one pair of concentric needles can be used on a single article.

Generally, any thermoformable material can be employed which materials include plastics such as homopolymers and copolymers of 1-olefins having from 2 to 8 carbon atoms per molecule, inclusive, polyamides, polyesters, polyvinyl alcohol, acrylic polymers, polyvinyl chloride, polyvinyl acetate, polyvinylidene chloride, and the like. Of course, mixtures of two or more of these polymers can also be employed.

Any conventional blowing fluid can be used, a preferred fluid being air at ambient temperature and a pressure of from about 50 to about 100 p.s.i.g. Also any cooling fluid can be used, a preferred fluid being liquid carbon dioxide.

EXAMPLE

Polyethylene having a density of 0.96 grams per cubic centimeter at 25° C. and a melt index of 0.2 is extruded at a temperature of about 400° C. to produce a hollow cylindrical parison. Air is passed through the extrusion die and the length of the cylindrical parison. The parison, while filled with, but not extended by, air is clamped between two mold halves such as those shown in FIGURE 1, one mold half carrying an injection needle 5. Needle 5 pierces the parison and air at about room temperature and at a pressure of 80 to 90 p.s.i.g. is introduced into the interior of the parison through needle 5 to force the parison out against the interior surfaces of molds 1 and 2. As parison 4 moves out towards the interior surface of mold 2 it is pierced by needle 7.

After the parison has been forced out against molds 1 and 2, liquid carbon dioxide is passed through the interior of needle 5 into the interior of the parison. Liquid carbon dioxide is passed through 5 and vaporizes in the interior of the molded parison. The pressure in the parison builds up to about 45 p.s.i.g. at which time valve 8 opens and vents vaporous carbon dioxide to the atmosphere, thus pulling carbon dioxide into the corner of the molded thermoplastic which is pierced by needle 7. The outlet end 9 of needle 5 as shown in FIGURE 1 is directed towards the lower left hand corner of mold 1 in FIGURE 1 but during the introduction of liquid carbon dioxide therethrough, that needle can be rotated so that liquid carbon dioxide is sprayed towards the upper left hand corner of mold 1 and all points in between as well. A second venting needle 7 can be employed in the lower right hand corner of mold 2 so that venting needles are employed in both the upper right hand and lower right hand corners of mold 2. Thus, by rotation of needle 5 and the use of two venting needles, all four corners of molds 1 and 2 as shown in FIGURE 1 can be properly cooled even though remote to the outlet end 9 of needle 5. Instead of rotating needle 5 additional venting needles 7 can be employed any place on parison 4 and, also, in lieu of any venting needle a second or more injection needles can be employed in mold 1 with their outlet ends directed towards the lower right hand corner of mold 2 and any other locus or lico so that when all the injection needles are rotated liquid carbon dioxide is directed towards all four corners and all sides of molds 1 and 2.

The molded, cooled article obtained when molds 1 and 2 are moved away from one another is uniformly cooled over substantially its entire interior surface and is not warped and does not have undesirable internal surface markings thereon which are indicative of non-uniform cooling.

Reasonable variations and modifications are possible within the scope of this disclosure without departing from the spirit and scope thereof.

I claim:

1. In apparatus for blow molding a parison, the improvement comprising at least one hollow needle means carried by at least one mold portion for piercing said parison, the outlet end of said needle means being at an angle to the longitudinal axis of said needle means so that fluid issuing from said outlet end is directed towards a certain locus or loci of said parison; and means to rotate said needle means so that said outlet end of said needle can be directed towards any desired locus either before or during the molding process.

2. The apparatus according to claim 1 wherein at least one mold portion carries at least one pressure release means adapted to also pierce said parison and being further adapted to vent the interior of said parison to the atmosphere when the pressure in the interior of said parison reaches a predetermined maximum value.

3. In apparatus for blow molding a parison, the improvement comprising in combination: at least one pair of hollow needle means carried in a concentric manner for piercing said parison, said at least one pair being carried by at least one mold portion, the outlet end of at least one needle of said at least one pair being at an angle to the longitudinal axis of said needle means so that fluid issuing from said outlet is directed toward a certain locus or loci of said parison, said needle having said outlet end being at least one of rotatably and longitudinally movable before or during the blow molding operation.

4. The apparatus according to claim 3 wherein the inner concentric needle of said at least one pair of needles is adapted to direct the flow of fluid issuing therefrom to a certain locus or loci on the interior surface of the parison, and said inner concentric needle is rotatable.

5. The apparatus according to claim 4 wherein said inner needle is also moveable parallel to its longitudinal axis so that its outlet end can be moved out away from the outlet end of the outer concentric needle.

6. The apparatus according to claim 3 wherein the outer concentric needle is adapted to direct the flow of fluid therethrough to a certain locus or loci on the interior of the parison, and said outer concentric needle is at least one of rotatable and moveable parallel to its longitudinal axis.

7. The apparatus according to claim 3 wherein at least one mold portion carries at least one pressure release means adapted to pierce the thermoplastic at points thereof which are difficult to cool, and vent the interior of the molded parison to the atmosphere when the pressure in the interior of said molded parison reaches a predetermined maximum value.

References Cited

UNITED STATES PATENTS

| | | |
|---|---|---|
| 3,089,185 | 5/1963 | Di Settembrini. |
| 3,114,931 | 12/1963 | Pelikan. |
| 3,338,998 | 8/1967 | Di Settembrini. |

WILBUR L. McBAY, Primary Examiner

U.S. Cl. X.R.

264—94